(12) United States Patent
Patwardhan et al.

(10) Patent No.: US 12,355,876 B2
(45) Date of Patent: Jul. 8, 2025

(54) KEY VALUE STORAGE DEVICE WITH HASHING

(71) Applicant: Samsung Electronics Co., Ltd., Suwon-si (KR)

(72) Inventors: Kedar Shrikrishna Patwardhan, Urbana, IL (US); Nithya Ramakrishnan, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 209 days.

(21) Appl. No.: 17/506,647

(22) Filed: Oct. 20, 2021

(65) Prior Publication Data
US 2023/0054127 A1 Feb. 23, 2023

Related U.S. Application Data

(60) Provisional application No. 63/234,613, filed on Aug. 18, 2021.

(51) Int. Cl.
| | |
|---|---|
| *H04L 9/08* | (2006.01) |
| *G06F 9/30* | (2018.01) |
| *H04L 9/06* | (2006.01) |

(52) U.S. Cl.
CPC ........ *H04L 9/0894* (2013.01); *G06F 9/30003* (2013.01); *H04L 9/0643* (2013.01)

(58) Field of Classification Search
CPC .. H04L 9/0894; H04L 9/0643; G06F 9/30003
See application file for complete search history.

(56) References Cited

U.S. PATENT DOCUMENTS

| | | |
|---|---|---|
| 5,692,177 A | 11/1997 | Miller |
| 8,271,500 B2 | 9/2012 | Chellapilla et al. |
| 8,880,544 B2 | 11/2014 | Bowden et al. |
| 9,075,710 B2 | 7/2015 | Talagala et al. |
| 9,612,955 B2 | 4/2017 | Akella et al. |
| 9,892,237 B2 | 2/2018 | Greenfield |
| 10,261,913 B2 | 4/2019 | Zhou |
| 10,496,283 B2 | 12/2019 | Waghulde |
| 10,558,705 B2 | 2/2020 | Sengupta et al. |
| 10,706,106 B2 | 7/2020 | Boles et al. |

(Continued)

FOREIGN PATENT DOCUMENTS

| | | |
|---|---|---|
| WO | WO 2008/037201 A1 | 4/2008 |
| WO | WO 2011/029212 A1 | 3/2011 |
| WO | WO 2019/156309 A1 | 8/2019 |

OTHER PUBLICATIONS

Biplob Debnath, et al., SkimpyStash: RAM Space Skimpy Key Value Store on Flash-based Storage, Jun. 12-16, 2011, SIGMOD' 11, Athens, Greece, pp. 25-36. (Year: 2011).*

(Continued)

*Primary Examiner* — Nelson S. Giddins
(74) *Attorney, Agent, or Firm* — Lewis Roca Rothgerber Christie LLP

(57) ABSTRACT

A system and method for storing data. In some embodiments, the method includes: receiving, by a persistent key-value storage device including a hash for mapping keys to value addresses, a first instruction, the first instruction being an instruction for accessing a first key, in a first key-value collection; and recording the first instruction in an instruction log of the persistent key-value storage device.

16 Claims, 10 Drawing Sheets

(56) References Cited

U.S. PATENT DOCUMENTS

| | | | |
|---|---|---|---|
| 10,783,186 | B2 | 9/2020 | Boles et al. |
| 10,915,546 | B2 | 2/2021 | Tomlinson |
| 10,956,324 | B1* | 3/2021 | Giles .................. G06F 9/526 |
| 11,474,699 | B1* | 10/2022 | Saha .................. H04L 9/0643 |
| 2012/0158674 | A1 | 6/2012 | Lillibridge |
| 2015/0058595 | A1* | 2/2015 | Gura .................. G06F 12/1018 |
| | | | 711/216 |
| 2017/0068700 | A1 | 3/2017 | Sapa et al. |
| 2017/0206231 | A1* | 7/2017 | Binder .................. G06T 15/06 |
| 2019/0042571 | A1* | 2/2019 | Li .................. G06F 3/061 |
| 2019/0138612 | A1 | 5/2019 | Jeon et al. |
| 2019/0332303 | A1 | 10/2019 | Watkins |
| 2020/0159629 | A1 | 5/2020 | Zhang et al. |
| 2020/0334258 | A1 | 10/2020 | Bortnikov et al. |
| 2022/0035737 | A1* | 2/2022 | Yasuda .................. G06F 12/06 |
| 2022/0207013 | A1* | 6/2022 | Soni .................. G06F 16/2272 |

OTHER PUBLICATIONS

Chai, Y. et al., "LDC: A Lower-Level Driven Compaction Method to Optimize SSD-Oriented Key-Value Stores", 2019 IEEE 35$^{th}$ International Conference on Data Engineering, 2019, pp. 722-733, IEEE.

Menon, P. et al., "CaSSanDra: An SSD Boosted Key-Value Store", 2014 IEEE 30$^{th}$ International Conference on Data Engineering, 2014, 6 pages, IEEE.

Debnath, Biplob, et al., "SkimpyStash: RAM Space Skimpy Key-Value Store on Flash-based Storage," Proceedings of the 2011 ACM Sigmod International Conference on Management of Data, 2011, 12 pages.

Lim, Hyeontaek, et al., "SILT: A Memory-Efficient, High-Performance Key-Value Store," ACM 2012 Conference on Computer Supported Cooperative Work Companion, ACM, 2011, 13 pages.

Lessley, Brenton, "Data-Parallel Hashing Techniques for GPU Architectures," arxiv.org, Cornell University Library, 2018, 26 pages.

Anand, Ashok, et al., "Cheap and Large CAMs for High Performance Data-Intensive Networked Systems," USENIX, The Advanced Computing Systems Association, 2019, 16 pages.

Kelly, Robert, et al., "Lock-Free Hopscotch Hashing," arxiv.org, Cornell University Library, 2019, 15 pages.

EPO Extended European Search Report dated Jan. 13, 2023, issued in corresponding European Patent Application No. 22188237.6 (11 pages).

Debnath, Biplob, et al., "Revisiting Hash Table Design for Phase Change Memory," Interactions of NVM/Flash With Operating Systems and Workloads, ACM, Oct. 2015, 9 pages.

* cited by examiner

KEY VALUE STORAGE DEVICE WITH HASHING

CROSS-REFERENCE TO RELATED APPLICATION(S)

The present application claims priority to and the benefit of U.S. Provisional Application No. 63/234,613, filed Aug. 18, 2021, entitled "NEAR-LINE PERFECT HASH FUNCTION COMPUTATION FOR COLLISION FREE INDEXING IN KV STORES", the entire content of which is incorporated herein by reference.

FIELD

One or more aspects of embodiments according to the present disclosure relate to persistent storage, and more particularly to a system and method for key value storage device with perfect hashing.

BACKGROUND

Key-value (KV) storage devices have various uses for data storage, e.g., in server systems. In such a storage device, data may be stored as values, each value being identified by a respective key, and a host using the KV storage device may, for example, send a read request including a key, the key identifying the value to be read from storage.

SUMMARY

In some embodiments, a KV persistent storage device (e.g., a KV SSD) uses a dynamic perfect hash to guarantee at most a single page read to look up a key. In some embodiments, a locality converter, a Bloom filter over the locality converter and a tail pointer table are employed between episodic updates to the perfect hash.

Between updates, instructions that affect the set of keys (e.g., by adding keys or deleting keys) may be recorded in the locality converter, and received instructions may check the locality converter (after first checking the Bloom filter) to ensure that any reads from the principal key-value store are valid. Key updates (e.g., Puts or Deletes) may be processed in a delayed fashion when the locality converter has gathered a sufficient number of updates.

According to an embodiment of the present disclosure, there is provided a method, including: receiving, by a persistent key-value storage device including a hash for mapping keys to value addresses, a first instruction, the first instruction being an instruction for accessing a first key, in a first key-value collection; and recording the first instruction in an instruction log of the persistent key-value storage device.

In some embodiments, wherein the hash is a hash function configured to avoid collisions.

In some embodiments, the recording of the first instruction in the instruction log includes recording the first instruction at a first position in the instruction log, the method further including: receiving a second instruction, the second instruction being an instruction for accessing a second value, in the first key-value collection; and recording the second instruction, with a pointer to the first position, at a second position in the instruction log.

In some embodiments, the recording of the first instruction in the instruction log includes storing a pointer to the first position in a location, corresponding to the first key-value collection, in a tail pointer table.

In some embodiments, the recording of the second instruction in the second position in the instruction log includes storing a pointer to the second position in the location, corresponding to the first key-value collection, in the tail pointer table.

In some embodiments, the first instruction is a delete instruction, and the method further includes adding the first key to a blacklist.

In some embodiments, the method further includes: receiving, by the persistent key-value storage device, a second instruction, the second instruction being an instruction for accessing the first key; determining that the first key is in the blacklist; and reporting the absence of the first key.

In some embodiments, the recording of the first instruction in the instruction log further includes adding the first key to a Bloom filter.

In some embodiments, the method further includes: receiving, by the persistent key-value storage device, a second instruction, the second instruction being an instruction for accessing the first key; determining that the first key is present in the instruction log; and in response to determining that the first key is present in the instruction log, accessing a value, associated with the first key, the value being at a first address, the first address being stored in the instruction log with the first key.

In some embodiments, the determining that the first key is present in the instruction log includes: determining, based on the Bloom filter, that the first key may be present in the instruction log.

According to an embodiment of the present disclosure, there is provided a persistent key-value storage device, including: a processing circuit; and persistent storage media, the storage device including a hash for mapping keys to value addresses, the hash including an instruction log, the processing circuit being configured to: receive a first instruction, the first instruction being an instruction for accessing a first key, in a first key-value collection; and record the first instruction in the instruction log.

In some embodiments, the hash is a hash function configured to avoid collisions.

In some embodiments: the recording of the first instruction in the instruction log includes recording the first instruction at a first position in the instruction log, and the processing circuit is further configured to: receive a second instruction, the second instruction being an instruction for accessing a second value, in the first key-value collection; and record the second instruction, with a pointer to the first position, at a second position in the instruction log.

In some embodiments, the recording of the first instruction in the instruction log includes storing a pointer to the first position in a location, corresponding to the first key-value collection, in a tail pointer table.

In some embodiments, the recording of the second instruction in the second position in the instruction log includes storing a pointer to the second position in the location, corresponding to the first key-value collection, in the tail pointer table.

In some embodiments, the first instruction is a delete instruction, and the processing circuit is further configured to add the first key to a blacklist.

In some embodiments, the processing circuit is further configured to: receive a second instruction, the second instruction being an instruction for accessing the first key; determine that the first key is in the blacklist; and report the absence of the first key.

In some embodiments, the recording of the first instruction in the instruction log further includes adding the first key to a Bloom filter.

In some embodiments, the processing circuit is further configured to: receive a second instruction, the second instruction being an instruction for accessing the first key; determine that the first key is present in the instruction log; and in response to determining that the first key is present in the instruction log, access a value, associated with the first key, the value being at a first address, the first address being stored in the instruction log with the first key.

According to an embodiment of the present disclosure, there is provided a persistent key-value storage device, including: means for processing; and persistent storage media, the storage device including a hash for mapping keys to value addresses, the hash including an instruction log, the means for processing being configured to: receive a first instruction, the first instruction being an instruction for accessing a first key, in a first key-value collection; and record the first instruction in the instruction log.

BRIEF DESCRIPTION OF THE DRAWINGS

The drawings are intended to provide illustrations of certain embodiments, and other embodiments, not specifically illustrated, are not excluded from the scope of this disclosure. These and other features and advantages of the present disclosure will be appreciated and understood with reference to the specification, claims, and appended drawings wherein:

DETAILED DESCRIPTION

Figure 1A:
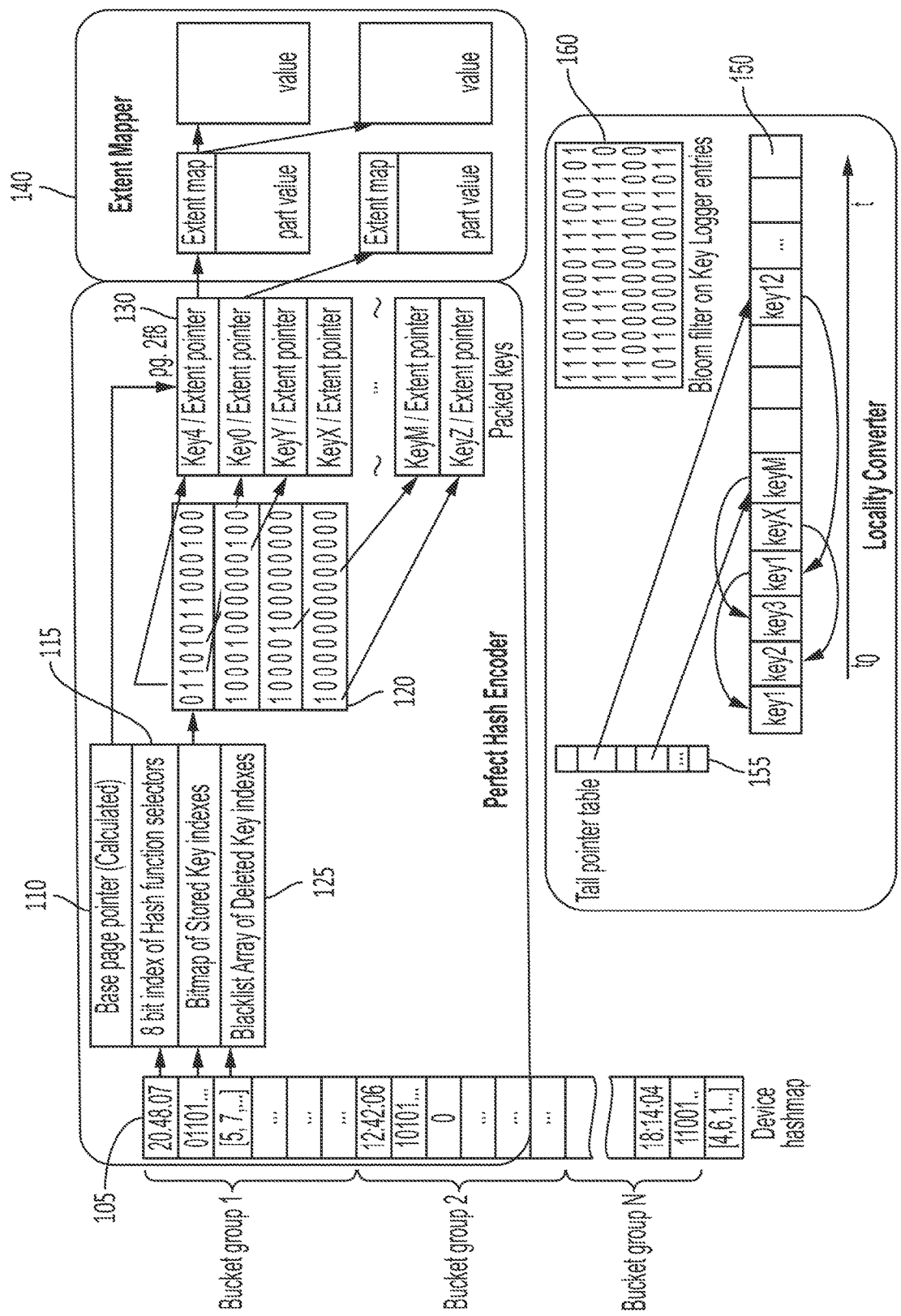
FIG. 1A is a block diagram of a storage device, according to an embodiment of the present disclosure.

The detailed description set forth below in connection with the appended drawings is intended as a description of exemplary embodiments of a key value storage device with perfect hashing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Reducing tail latency of key-value (KV) operations may be advantageous for several workloads like artificial intelligence, machine learning, data sciences and deduplicated backup stores. Some KV store implementations use a fixed hash function to hash a (time-moving) set of keys to buckets. Keys thus hashed into buckets may cause collisions, with collision chain length causing long tail latency. A worst-case tail latency may be proportional to the length of longest collision chain in buckets of the hash map. In a KV store implemented in a solid state drive (SSD), locating a key may take several Not-AND (NAND) page reads, and the longest tail latency reads may require a relatively large number of NAND page reads (e.g., as many as 18 to 22 NAND page reads). As such, collisions may result in significant performance degradation. For workloads in which KV uploads happen in bulk and episodically, and which have a read-intensive access pattern, even the occasional avoiding of a single NAND page key lookup may result in a considerable performance improvement.

KV SSDs and KV stores may implement a hashmap within the storage device wherein a single key is stored in a NAND page, resulting in higher device write amplification factor (WAF) when processing Delete instructions and higher read amplification factor (RAF) when processing Put, Get, or Exist instructions. To address collisions within the hashmap, NAND pages containing keys that collide on a bucket number may be chained together. The worst-case tail latency of such a KV store may be proportional to the length of longest collision chain in buckets of the hashmap. As mentioned above, in such an approach, collision may result in performance degradation.

As such, in some embodiments, a KV persistent storage device (e.g., a KV solid state drive (SSD)) uses a dynamic perfect hash to guarantee at most a single page read to look up a key. In some embodiments, a locality converter (which may also be referred to as an "instruction log"), a Bloom filter over the locality converter and a tail pointer table are employed between episodic updates to the perfect hash. Key updates (e.g., Puts or Deletes) may be processed in a delayed fashion when the locality converter has gathered a sufficient number of updates. The locality converter, the Bloom filter, and the tail pointer table may be employed for accessing the keys (e.g., upon receipt of corresponding instructions from a host). As used herein, an instruction for "accessing" a key in the persistent storage device is any instruction (such as a Put, a Get, a Delete, or an Exist) that reads or writes the key or determines whether it is stored in the storage device.

In some embodiments, the buckets of the hashmap are grouped together into bucket groups (which may also be referred to as "key-value collections"). A fixed hash function (different from the perfect hash) is employed to first map each key to a bucket group; this fixed hash function may map a plurality of keys to each bucket group. The fixed hash function may be a single, unchanging hash function (i.e., unlike the has functions used to implement the perfect hash (discussed in further detail below), it may not be replaced with a different hash function during operation). A respective perfect hash is then employed, within each bucket group, to map each key to a bucket, without collisions. The keys belonging to multiple buckets in a group may be packed into a single NAND page. As used herein, a "bucket" is a storage location in which a value is stored, or, equivalently, the stored value itself. As used herein, a "bucket group" is a collection of such buckets, grouped together, for example, for purposes of facilitating access.

In some embodiments, the system is constructed according to FIG. 1. A first table, which may be referred to as a hash map 105, is used to store one entry for each bucket group. The hash map 105 may be sized to fit in a region of dynamic random-access memory (DRAM) that may be provided in the persistent storage for use with a hash function in which collisions may occur and keys are chained to accommodate collisions. Such a region may have a size of, e.g., four bytes per bucket; as such, the entries of the hash map 105 may be sized accordingly. Each entry of the hash map 105 includes: (i) a base page pointer 110, (ii) a set of hash function selectors 115, (iii) a stored key bitmap 120, and (iv) a blacklist array 125 (each of which is discussed in further detail below). The base page pointer is a static pointer to a predetermined logical page address (the base page address) at the start of a contiguous logical storage area (or "key storage area" 130) for the bucket group, that is large enough to store N (where, e.g., N<=15*Number of buckets in the bucket group) keys per bucket group. The hash function selectors (e.g., 8-bit indexes) select hash functions from a universal hash function generator. In some embodiments, the hash map 105 includes between 3 and 5 such selectors for each bucket group. The stored key bitmap (which may be referred to simply as the "bitmap") is an injective transformation that maps a bit location, or "bit offset" within the bitmap to a unique key offset, which specifies the logical address at which the key is stored, relative to the base page address. Each set bit in the bitmap corresponds to a key in the packed keys stored in the key storage area, which may be a set of NAND pages beginning at the base page address for that bucket group.

The keys may be stored in the key storage area in consecutive fields referred to as "key slots", each key slot having a width sufficient to accommodate the largest possible key (e.g., a width of between 32 and 255 bytes). The keys are written in the key storage area so that the $n^{th}$ set bit of the bitmap corresponds to the $n^{th}$ key slot in the key storage area; for example, the $10^{th}$ set bit (which could be at bit offset 25, say, in the bitmap) corresponds to key slot number 10 from the base page address. For example, if each NAND page can store 64 keys total, then the 100th set bit in the bitmap corresponds to the $36^{th}$ key in the second NAND page. The blacklist array stores the indexes of any keys that have been deleted (as a result of a Delete instruction received from the host) but the deletion of which is not yet reflected in the bitmap and in the key storage area containing the packed keys. The keys are packed into the NAND pages of the key storage area such that there are at most P keys in each NAND page, where P is calculated for the longest key name (e.g., key sizes could be, say, less than 24 bytes or less than 256 bytes based on the applications). In some embodiments, the logical-to-physical (L2P) table is repurposed to store the hash map 105 (which contains the hash function selectors, the bitmap for stored keys and the blacklist array of deleted key indexes).

The data organization described above may implement a perfect hash. As used herein, a "hash" is a system or method (or combination thereof) for mapping keys to values. As used herein, a "perfect hash" is a hash function that avoids collisions.

Figure 1B:
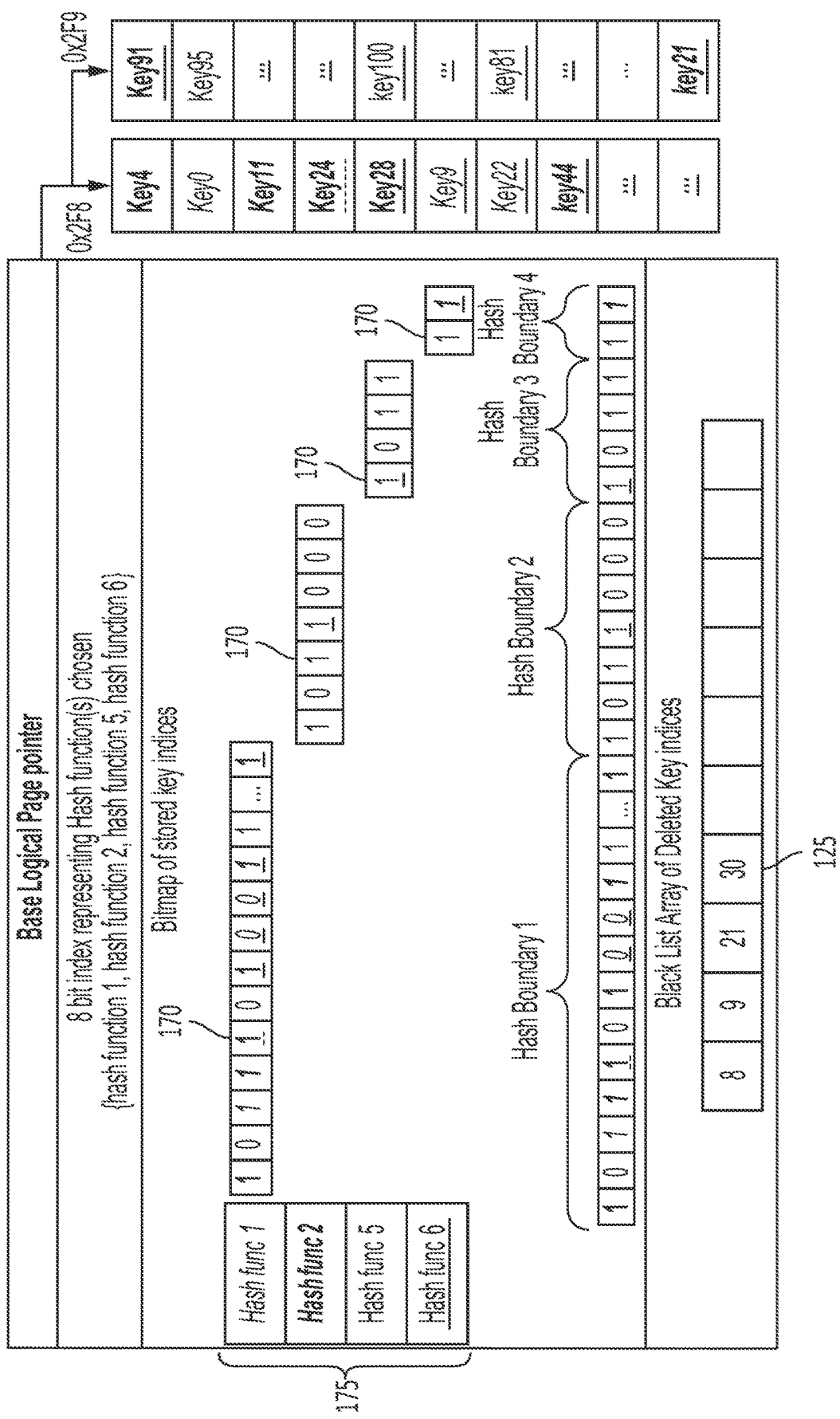
FIG. 1B is a schematic illustration of hash functions and bitmap sections, according to an embodiment of the present disclosure.
Figure 2:
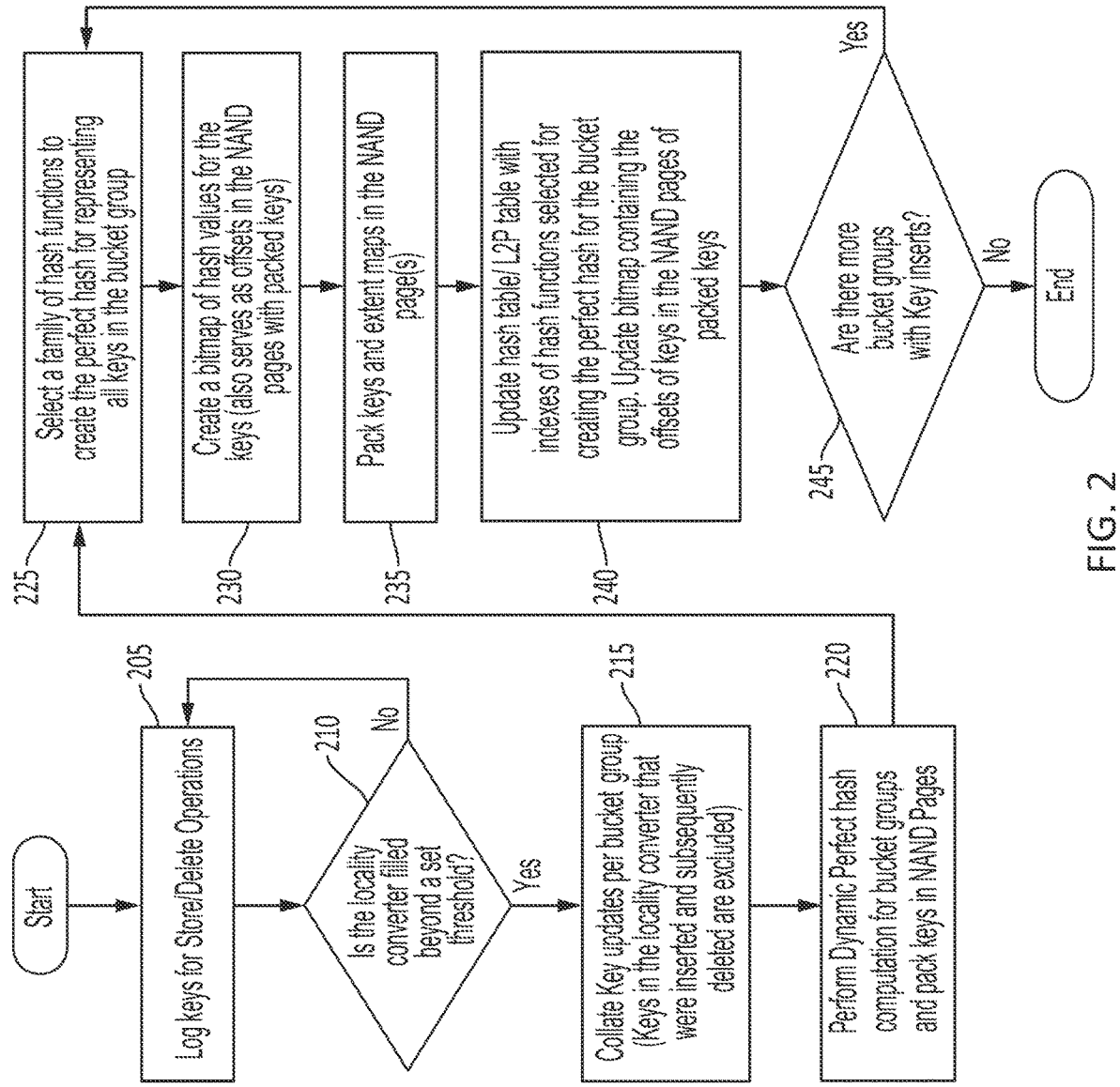
FIG. 2 is a flowchart of a method for operating a KV persistent storage device, according to an embodiment of the present disclosure.

To construct the storage data structure initially, and to re-construct it when desired (e.g., after a number additions and deletions have been performed by the host), the following method may be used. Referring to FIGS. 1B and 2, when constructing the perfect hash for a bucket group, the bits in the bitmap space of the bucket group are all set to 0 and the bitmap space is partitioned into K sections 170. A family of hash functions 175 is selected, at 205, a first hash function is selected from a family of hash functions 175, and all keys in the bucket group are hashed (e.g., mapped to a respective bit offset), at 210, such that each key is represented in the first section of the hash map 105. For each key that is represented in the first section of the bitmap without a collision, the corresponding bit in the stored key bitmap is set to 1. If any collisions occurred, then another hash function is selected, and the keys that collided with other keys (i.e., the keys which were mapped to a bit that was already set to 1) are hashed into the $2^{nd}$ section of the bitmap. As in the first iteration, each key is mapped to a bit of the second section of the bitmap; if this bit is not already set, it is set to 1; if it is already set, then the key is added to a list of keys that collided upon being hashed. This approach is repeated, each time with the next section of the stored key bitmap and with a new hash function, until no collisions occur in a section of the stored key bitmap, or until the Kth section is used and a collision occurs. At the end of the K iterations (or sooner), either all keys will have been exhausted or some keys will have collided in the Kth section of the bitmap. If there are collisions in the Kth section of the bitmap the entire process may be repeated, after clearing the stored key bitmap, by selecting a new hash function for the 1st section of the bitmap. In some embodiments, a perfect hash may be created by the method described, for about 40 to 100 million keys per second per ARM core.

Each value may be stored in persistent storage. The values may have variable sizes and they may be large; as such, some of the values may be fragmented in storage. The key storage area may store, along with each key, a pointer to an address (e.g., a physical address) in an extent mapper 140 (which may be the (possibly fragmented) storage area for storing values. In the extent mapper, each value may be stored as one or more entries in a linked list, as shown.

Referring to FIG. 2, when keys are added or deleted, a locality converter 150 and blacklist array may be employed (at 205, as discussed in further detail below) to continue performing Get, Put, and Delete instructions without regenerating the perfect hash as described above. This mode of operation may result in a gradual increase in the size of the locality converter and of the blacklist array. Eventually, e.g., once the size of the locality converter or of the blacklist array has reached a respective threshold, as determined at 210, the hash may be updated or reconstructed. In FIG. 2, this process is illustrated as follows. At 215, the key updates (each of which is saved in the locality converter as part of a corresponding instruction recorded in the locality converter) are collated per bucket, and at 220, a dynamic perfect hash computation is performed. At 225 a family of hash functions is selected to create the perfect hash for representing all keys in the bucket group, at 230, a bitmap of hash values for the keys is created (this bitmap also serves to determine offsets in the key storage area), and, at 235, the keys are packed into the key storage area and the values are stored in the extent mapper. At 240, the hash map (or L2P table) may be updated with indexes of hash functions selected for creating the perfect hash for the bucket group and the bitmap containing the offsets of keys in the NAND pages of packed keys may be updated. The process is repeated for each bucket group; if, as determined at 245, more bucket groups remain to be processed, the process returns to step 225.

Figure 3:
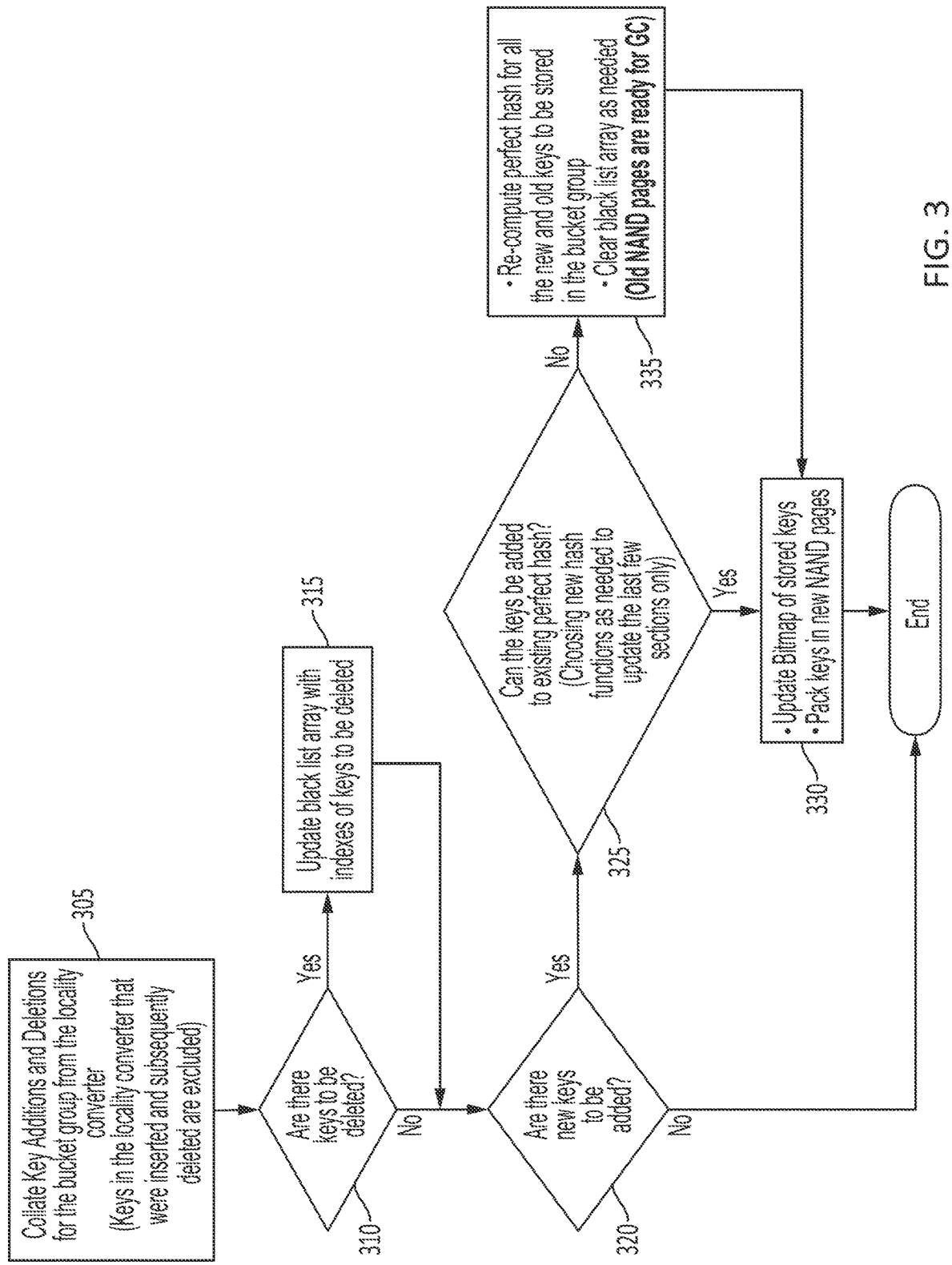
FIG. 3 is a flowchart of a method for updating a perfect hash, according to an embodiment of the present disclosure.

FIG. 3 shows a process for updating the perfect hash. At 305, the key additions and deletions for the bucket group, in the locality converter, are collated (keys in the locality converter that were inserted and subsequently deleted are excluded). If, as determined at 310, there are keys to be deleted, then at 315, the blacklist array is updated with the indexes of the keys to be deleted. If, as determined at 320, new keys are to be added, then, if, as determined at 325, the keys can be added to the existing perfect hash (choosing new hash functions as needed to update the last few sections only), the stored key bitmap is updated and the keys are packed in new NAND pages, at 330.

In this process, the bit corresponding to any deleted key may be cleared and the bit corresponding to any added key may be set (if it is not already set; if it is, mapping to other sections of the bit map may be attempted). If the existing hash functions are able to accommodate the updated keys using this process, the contents of the key storage area may be updated accordingly. If the existing hash functions are unable to accommodate the updated keys, the hash functions of only the last few sections of the bitmap may be changed, such that the new set of keys can be represented as a perfect hash with minimal compute effort.

If attempts to change some but not all of the hash functions also fail (e.g., if, as determined at 325, the keys cannot be added to existing perfect hash), then the entire hash may be reconstructed. Even this brute force computation may be fast (30-100 million keys per second). At 335, the perfect hash is re-computed for all the new and old keys to be stored in the bucket group, the blacklist array is cleared as needed, the keys are packed in new NAND pages (i.e., forming a new key storage area), and the old NAND pages (of the previously used key storage area) are ready for device garbage collection.

As mentioned above, instructions that add or delete keys (e.g., write instructions with keys not already stored, or Delete instructions) may be handled by recording each such instruction in (e.g., appending each such instruction to) the locality converter, which is a storage area, organized as a log-structured store, for recording such instructions. As used herein, "recording an instruction" in the locality converter means storing, in the locality converter, sufficient information for the instruction to be performed later (e.g., storing the operation to be performed (e.g., whether it is a Put, a Get, a Delete, or an Exist), storing the key, and storing the value (or a pointer to the value) if the value is to be written or modified). As used herein, a "locality converter" is any data structure suitable for storing sufficient information for an instruction to be performed later. The instructions may be saved in the locality converter as a linked list for each bucket group. A tail pointer table 155 (FIG. 1), for each bucket group, may point to the last entry added, for the bucket group. When an instruction is added to the locality converter, the Bloom filter 160 is updated to record the presence of the key by setting appropriate bits. In some embodiments, the instructions for each bucket group are saved to a separate respective locality converter for the bucket group (instead of all of the instructions being saved to a locality converter shared by several (e.g., all) of the bucket groups).

When keys are deleted (as a result of a delete instruction received from a host), the position of the deleted keys in the stored key bitmap is marked in the blacklist array (which, as mentioned above, is maintained per bucket group). During subsequent lookups, if a key is found in the bitmap, its position is also checked in the blacklist array to ensure that it has not been deleted (without the key storage area having been updated yet to reflect the deletion).

Figure 4:
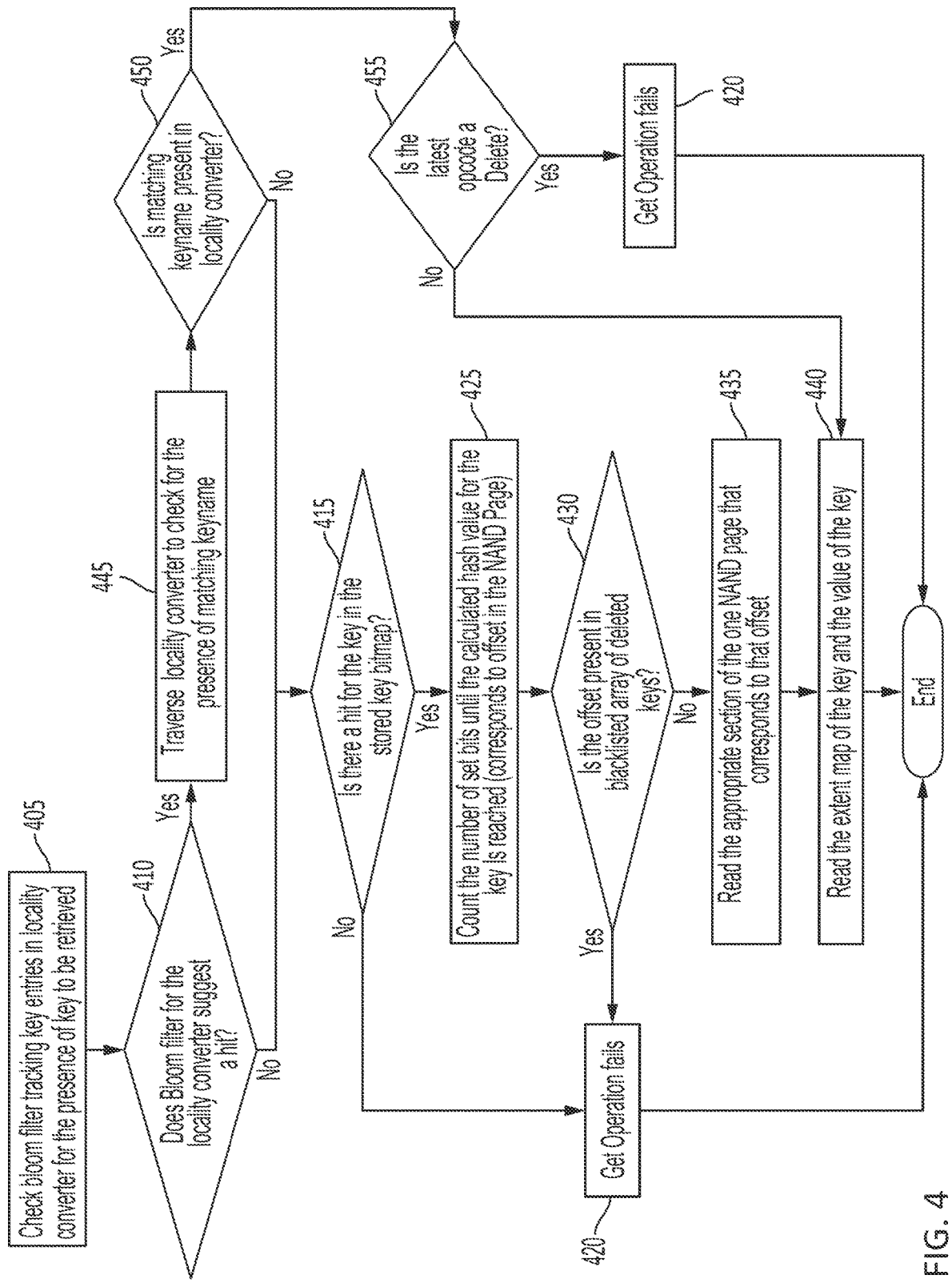
FIG. 4 is a flowchart of a method for handling an instruction for accessing a first value, according to an embodiment of the present disclosure.

Referring to FIG. 4, in operation, a key lookup operation (e.g., as part of a Get instruction) may include checking whether the key is in the locality converter by consulting, at 405, the Bloom filter of the locality converter. If, as determined at 410, the key is not present in the locality converter, it is hashed (using the fixed hash function) to one of the bucket groups. Based on the bucket group the key is mapped into, the hash function for the bucket group is chosen according to the hash function selectors for the bucket group, and the bitmap is checked to see whether the bit corresponding to the key is set. If, as determined at 415, the bit is not set, then the absence of the key from the storage system is guaranteed, and the system concludes, at 420, that the key is not stored (the system may then report the absence of the first key to the host). In this situation it is not necessary to compare the key received with the Get instruction to any key stored in the key storage area. As such, a failed key lookup may be quite fast, which may be particularly advantageous for Purpose-Built Backup Appliance and cloud backup applications.

If, as determined at 415, the bit corresponding to the key is set in the bitmap, then the key is read from the key storage area (after determining its location in the key storage area by counting, at 425, the number of bits set in the bitmap to determine the offset of the bit corresponding to the key). If the key in the storage area matches the key being looked up then the key lookup has succeeded (and, e.g., the Get instruction may be completed by looking up and returning the value). If the key in the storage area does not match the key being looked up then the key lookup has failed (e.g., the key being looked up is a key that the hash function maps to the same bit as a different key that is stored).

To avoid the page read used to compare the stored key to the key being looked up, the blacklist array containing the indexes of deleted keys may be consulted, at 430, to ensure that the key is not already deleted, before reading the stored key from the key storage area. If the key index is in the blacklist array, then the system concludes, at 420, that the key is not stored. If the key is not already deleted, then the appropriate section of the one NAND page that corresponds to that offset can be read, at 435, and the value is read from the extent mapper at 440. If, as determined at 410, the Bloom filter indicates that the key may be present in the locality converter, the locality converter is traversed, at 445. If, as determined at 450, the key is not present in the locality converter, the process returns to step 415. If the key is present in the locality converter, and if, as determined at 455, the last instruction recorded for the key is not a delete instruction, then the process returns to step 440; otherwise the system concludes, at 420, that the key is not stored.

In some embodiments, efficient collaborative garbage collection between backup appliances and KV stores is performed. Backup appliances may store the keys (finger prints) in backup file descriptors (potentially storing thousands to millions of such keys). A single key may potentially be stored in multiple backups. When backups are deleted, some keys may be orphaned; orphaned keys are not tracked by the appliances. As such, some embodiments enable appliances to access the bitmap of stored keys within a bucket group. In such an embodiment, the appliance may identify which bucket and bucket group a key in a live backup belongs to and obtain the bitmap of stored keys in that bucket group. This may be done for all keys in live backups. The appliance may then return a modified bitmap per bucket group indicating which keys must be retained and which are to be deleted. The device may then process this list and perform an appropriate delete action on each key that is no longer needed.

Figure 5:
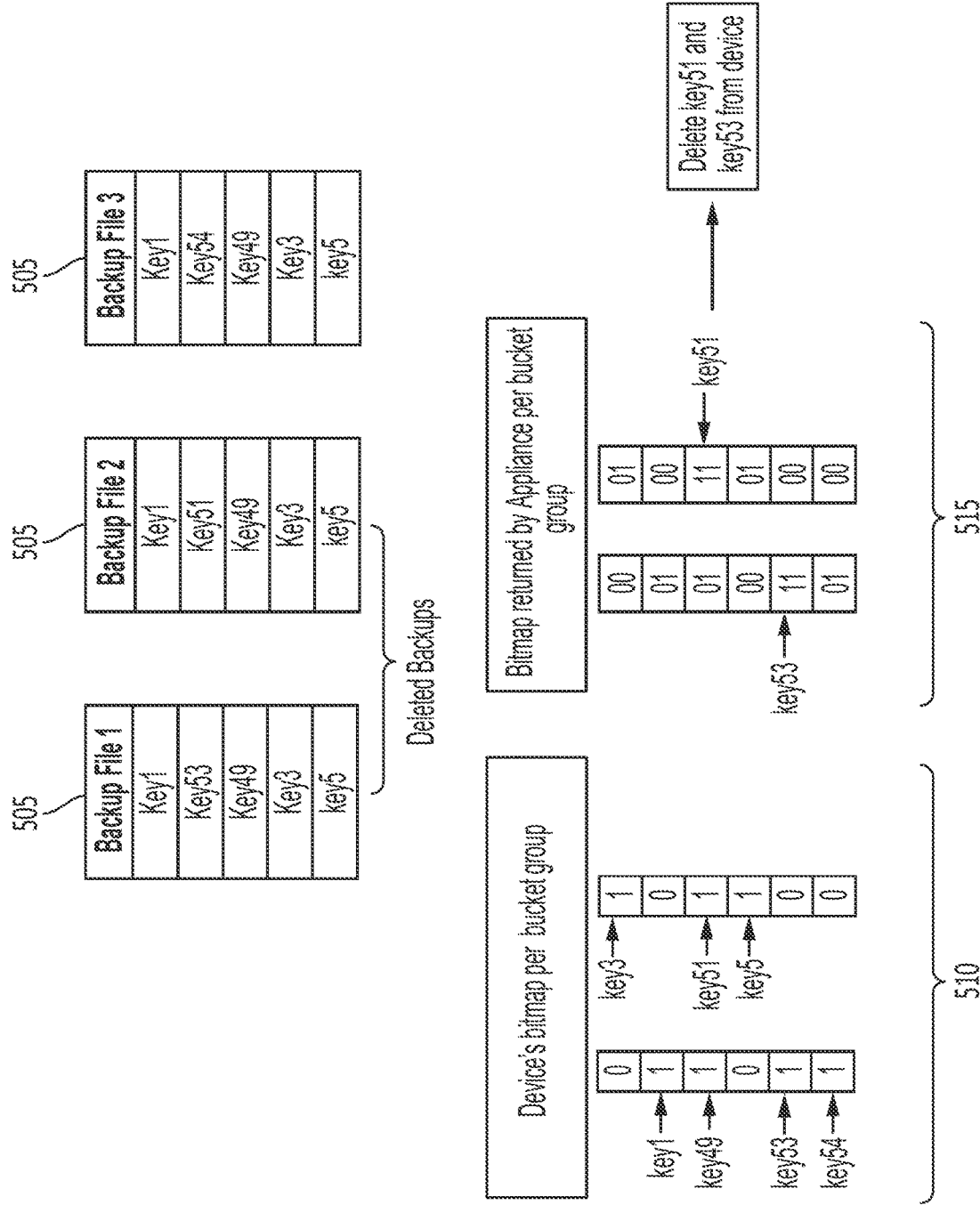
FIG. 5 is a schematic illustration of a set of backup files and corresponding bitmaps, according to an embodiment of the present disclosure.
Figure 6:
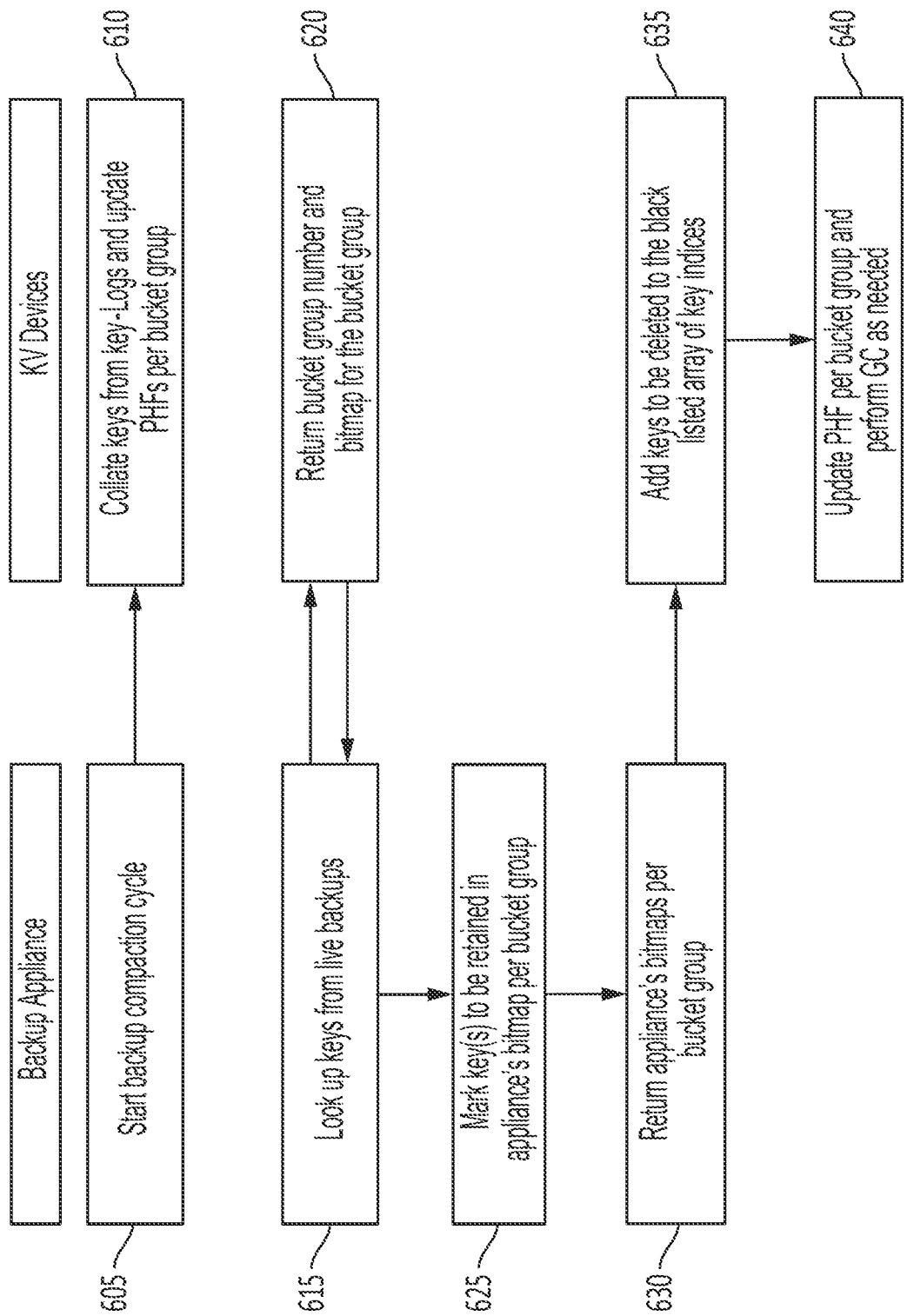
FIG. 6 is a flowchart for handling orphaned data in a backup appliance, according to an embodiment of the present disclosure.

This process is illustrated in FIGS. 5 and 6. In FIG. 5, the backup appliance includes three backup files 505, of which two are deleted. As a result of the deletions, two keys, Key51 and Key53, become orphaned. In some embodiments, the orphaned keys are identified as follows. First, the KV storage device reports its bitmap 510 to the backup appliance. The backup appliance first appends a zero to each bit of the bitmap (so that each 0 becomes 00, and each 1 becomes 10). The backup appliance then hashes each of the keys in the backup files to be deleted into the bitmap, changing each value of 10 to 11, and it hashes each of the keys in the backup files that are to be retained into the bitmap, changing each value of 11 or 10 to 01. Finally, the backup appliance instructs the KV storage device to delete the orphaned keys, e.g., by sending the modified bitmap 515 (which identifies orphans with the value 11) back to the KV storage device. In this embodiment the outcome is the same regardless of the order in which the backup appliance hashes the backup files, because, for example, if the backup file to be retained is hashed first, it will convert 10 to 01, which will prevent the subsequent hashing of a file to be deleted from converting these values to 11.

FIG. 6 is a flowchart illustrating the process. At 605, the backup appliance starts a backup compaction cycle, and at 610, in response to a suitable instruction received from the backup appliance, the KV storage devices collate keys from locality converters (key-Logs) and update perfect hash functions (PHFs) per bucket group. At 615, the backup appliance looks up keys from live backups (i.e., from backup files not being deleted) and at 620, the KV storage devices return bucket group number and bitmap for the bucket group to the backup appliance. At 625, the backup appliance marks the key or keys to be retained in the appliance's bitmap per bucket group, and at 630, it returns the backup appliance's bitmaps per bucket group. At 635, the KV storage devices then add the keys to be deleted to the blacklist arrays, and at 640, they update the perfect hash functions per bucket group and perform device garbage collection as needed.

Figure 7:
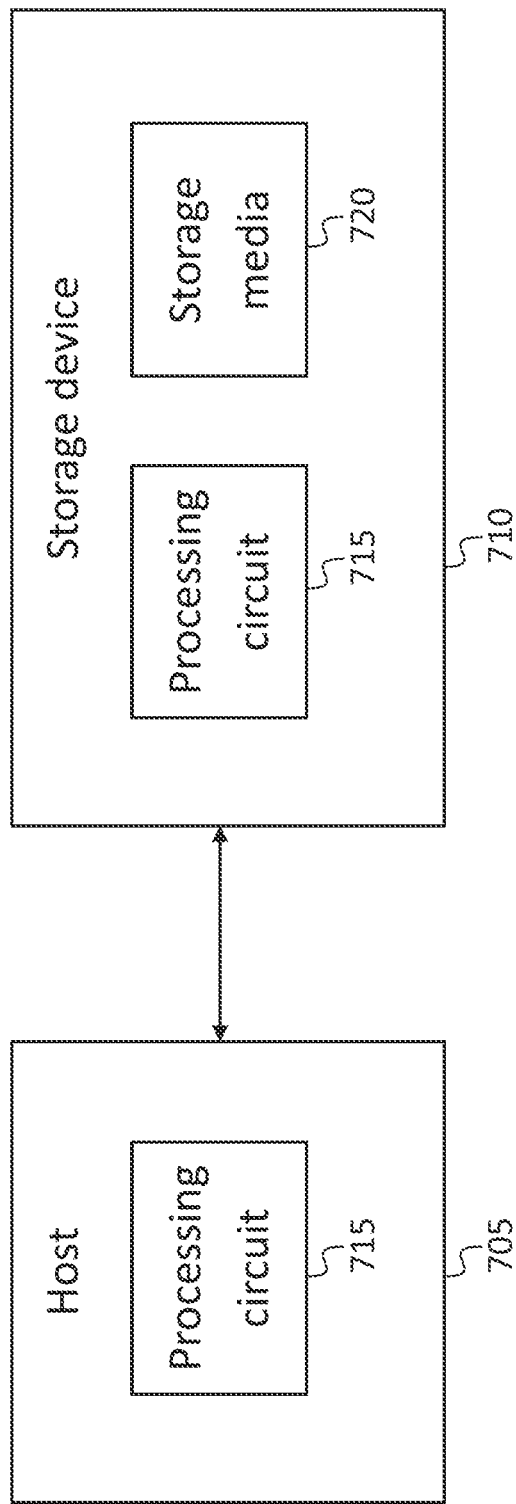
FIG. 7 is a block diagram of a host and a storage device, according to an embodiment of the present disclosure.
Figure 8:
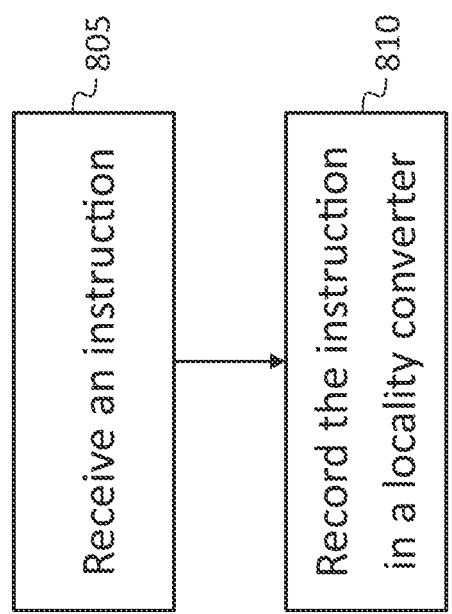
FIG. 8 is a flow chart of a method for handling an instruction, according to an embodiment of the present disclosure.
Figure 9:
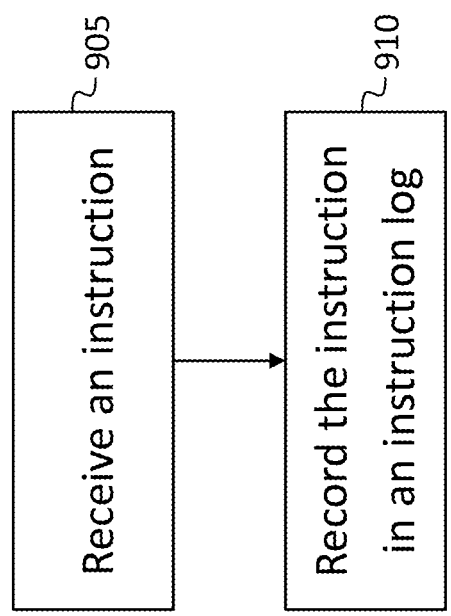
FIG. 9 is a flow chart of another method for handling an instruction, according to an embodiment of the present disclosure.

FIG. 7 is a block diagram of a host 705 and a storage device 710 (which may be a KV storage device, e.g., a KV SSD). The storage device 710 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 705, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS). Each of the host 705 and the storage device 710 may include a processing circuit 715 (discussed in further detail below). The storage device 710 may also include persistent storage media 720 (e.g., NAND flash). The processing circuit 715 of the storage device 710 may perform (and, using the processing circuit 715 that it contains, the storage device 710 may perform) some or all of the methods described herein. FIGS. 8 and 9 are flowcharts showing that, in some embodiments, the storage device 710 may, at 805 or at 905, receive an instruction (e.g., it may receive an instruction from the host 705), and it may, at 910, record the instruction in the instruction log (or, at 810, in the locality converter).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B". As used herein, the term "array" refers to an ordered set of numbers regardless of how stored (e.g., whether stored in consecutive memory locations, or in a linked list).

The background provided in the Background section of the present disclosure section is included only to set context, and the content of the Background section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a key value storage device with perfect hashing have been specifically described and illustrated herein, many modifications and variations will be apparent to those skilled in the art. Accordingly, it is to be understood that a key value storage device with perfect hashing constructed according to principles of this disclosure may be embodied other than as specifically described herein. The invention is also defined in the following claims, and equivalents thereof.

What is claimed is:

1. A method, comprising:
receiving, by a persistent key-value storage device comprising a hash for mapping keys to value addresses, a first instruction, the first instruction being an instruction for deleting a first key, in a first key-value collection, wherein the first instruction includes an operation;
recording the first instruction in an instruction log of the persistent key-value storage device;
updating an array of indexes of keys for deletion, from the first key-value collection, with an index of the first key;
receiving, by the persistent key-value storage device, a second instruction, the second instruction being an instruction for accessing the first key;
determining that the index of the first key is included in the array;
reporting an absence of the first key; and
modifying the hash based at least in part on a size of the instruction log, wherein modifying the hash includes adding a key based on an instruction in the instruction log.

2. The method of claim 1, wherein the hash is a hash function configured to avoid collisions.

3. The method of claim 1, wherein the recording of the first instruction in the instruction log comprises recording the first instruction at a first position in the instruction log, the method further comprising:
receiving a second instruction, the second instruction being an instruction for accessing a second value, in the first key-value collection; and
recording the second instruction, with a pointer to the first position, at a second position in the instruction log.

4. The method of claim 3, wherein the recording of the first instruction in the instruction log comprises storing a pointer to the first position in a location, corresponding to the first key-value collection, in a tail pointer table.

5. The method of claim 4, wherein the recording of the second instruction in the second position in the instruction log comprises storing a pointer to the second position in the location, corresponding to the first key-value collection, in the tail pointer table.

6. The method of claim 1, wherein the recording of the first instruction in the instruction log further comprises adding the first key to a Bloom filter.

7. The method of claim 6, further comprising:
receiving, by the persistent key-value storage device, a second instruction, the second instruction being an instruction for accessing the first key;
determining that the first key is present in the instruction log; and
in response to determining that the first key is present in the instruction log, accessing a value, associated with the first key, the value being at a first address, the first address being stored in the instruction log with the first key.

8. The method of claim 7, wherein the determining that the first key is present in the instruction log comprises:
determining, based on the Bloom filter, that the first key may be present in the instruction log.

9. A persistent key-value storage device, comprising:
a processing circuit; and
non-transitory persistent storage media, the persistent key-value storage device comprising a hash for mapping keys to value addresses, the hash comprising an instruction log, the processing circuit being configured to:
receive a first instruction, the first instruction being an instruction for deleting a first key, in a first key-value collection, wherein the first instruction includes an operation;
record the first instruction in the instruction log;
update an array of indexes of keys for deletion, from the first key-value collection, with an index of the first key;
receive a second instruction, the second instruction being an instruction for accessing the first key;
determine that the index of the first key is included in the array;
report an absence of the first key; and
modify the hash based at least in part on a size of the instruction log, wherein modifying the hash includes adding a key based on an instruction in the instruction log.

10. The persistent key-value storage device of claim 9, wherein the hash is a hash function configured to avoid collisions.

11. The persistent key-value storage device of claim 9, wherein:
the recording of the first instruction in the instruction log comprises recording the first instruction at a first position in the instruction log, and
the processing circuit is further configured to:
receive a second instruction, the second instruction being an instruction for accessing a second value, in the first key-value collection; and
record the second instruction, with a pointer to the first position, at a second position in the instruction log.

12. The persistent key-value storage device of claim 11, wherein the recording of the first instruction in the instruction log comprises storing a pointer to the first position in a location, corresponding to the first key-value collection, in a tail pointer table.

13. The persistent key-value storage device of claim 12, wherein the recording of the second instruction in the second position in the instruction log comprises storing a pointer to the second position in the location, corresponding to the first key-value collection, in the tail pointer table.

14. The persistent key-value storage device of claim 9, wherein the recording of the first instruction in the instruction log further comprises adding the first key to a Bloom filter.

15. The persistent key-value storage device of claim 14, wherein the processing circuit is further configured to:
receive a second instruction, the second instruction being an instruction for accessing the first key;
determine that the first key is present in the instruction log; and
in response to determining that the first key is present in the instruction log, access a value, associated with the first key, the value being at a first address, the first address being stored in the instruction log with the first key.

16. A persistent key-value storage device, comprising:
means for processing; and
non-transitory persistent storage media, the persistent key-value storage device comprising a hash for mapping keys to value addresses, the hash comprising an instruction log,
the means for processing being configured to:
receive a first instruction, the first instruction being an instruction for deleting a first key, in a first key-value collection, wherein the first instruction includes an operation;
record the first instruction in the instruction log;
update an array of indexes of keys for deletion, from the first key-value collection, with an index of the first key;
receive a second instruction, the second instruction being an instruction for accessing the first key;
determine that the index of the first key is included in the array;
report an absence of the first key; and
modify the hash based at least in part on a size of the instruction log, wherein modifying the hash includes adding a key based on an instruction in the instruction log.

* * * * *